United States Patent [19]

Close

[11] Patent Number: 4,742,119

[45] Date of Patent: May 3, 1988

[54] PROTECTIVE AND ADHESIVE COMPOSITIONS

[75] Inventor: Donald S. Close, Stow, Ohio

[73] Assignee: Syn-Coat Enterprises, Inc., Stow, Ohio

[21] Appl. No.: 835,092

[22] Filed: Feb. 28, 1986

[51] Int. Cl.$^4$ .............. C08L 23/16; C08L 15/02; C08L 9/00

[52] U.S. Cl. .................... 525/211; 525/232; 525/237; 525/192; 524/518; 524/526

[58] Field of Search .............. 525/192, 211, 237, 232

[56] References Cited

U.S. PATENT DOCUMENTS

| | | | |
|---|---|---|---|
| T857-044 | 12/1968 | Ladocsi et al. | 525/211 |
| 3,630,974 | 12/1971 | Landosci et al. | 525/211 |
| 3,651,176 | 3/1972 | Usamoto et al. | 525/211 |
| 3,801,531 | 4/1974 | Berejka et al. | 524/490 |
| 4,025,695 | 5/1977 | Newman | 525/194 |
| 4,164,500 | 8/1979 | Diamond et al. | 525/211 |
| 4,212,787 | 7/1980 | Matsuda et al. | 525/211 |
| 4,244,843 | 1/1981 | Hashimoto et al. | 525/194 |
| 4,248,987 | 2/1981 | Maeda et al. | 525/194 |

FOREIGN PATENT DOCUMENTS 7245184  11/1972  Japan .................. 525/187

*Primary Examiner*—Carman J. Seccuro
*Attorney, Agent, or Firm*—Oldham, Oldham & Weber Co.

[57] ABSTRACT

Adhesive compositions are shown made from mixtures of EPDM and halogenated butyl rubber compounds. The mixture may either be dissolved in solvents and applied as adhesive solutions, or they may be incorporated with tackifiers and formed into adhesive tapes. The compositions are particularly useful in adhering strips of EPDM membrane roofing to each other; however, they may also be used as protective coatings and linings.

4 Claims, No Drawings

PROTECTIVE AND ADHESIVE COMPOSITIONS

TECHNICAL FIELD

This invention relates to adhesive materials and their method of preparation. More particularly this invention concerns the preparation of adhesive substances useful in installing roofing materials.

Flat roofing systems of the single ply, membrane type are widely used not only throughout the United States, but elsewhere in the world as well. Systems of this type are easily and quickly installed compared to most other methods of roofing construction. Of the various membranes which are employed in such roofing systems, those made from EPDM have been found to be greatly superior to most other membranes, since they exhibit excellent weathering characteristics and, therefore, provide long-term protection for buildings on which they are installed.

Roofing systems which contain EPDM membranes have such superior qualities, that roofing membranes of this type now comprise over 65% of the total single ply market. They are currently enjoying an annual growth rate of over 20%, and the market for them exceeds well over 500 million square feet of roofing each year.

While such roofs have experienced great popularity due to their long life characteristics, they do exhibit one important drawback in that EPDM membranes possess low polarity properties and, therefore, are extremely difficult to bond together. Flat membrane roofs are constructed by laying down successive strips of the membrane material in the form of relatively thin sheets; the edge of each strip slightly overlaps the adjacent strip, and must be attached to it with an adhesive in order that an integral, waterproof bond can be formed. Consequently, it will readily be appreciated that the bonding process is of extreme importance if a high quality, weatherproof roof is to be obtained.

BACKGROUND ART

In the past, numerous adhesive systems have been proposed and used to achieve such bonding. For example, use has been made of neoprene-phenolic type contact adhesives. Unfortunately, however, the wetting quality of this type of adhesive is unsatisfactory, particularly in the case of EPDM materials. This frequently results in an inability to achieve a continuous adhesive bonding film on the EPDM surface, producing consequential reduction in bond strength. Furthermore, the neoprene-phenolic adhesives do not have the ability to satisfactorily crosslink, greatly reducing their cohesive strength.

Attempts have been made to overcome the wetting problems attendant to this type of adhesive system by using primers to wet the surface of the EPDM films, and thus allow the neoprene-phenolic adhesive to form a continuous bonding film on the primed EPDM surface. While this expedient tends to overcome the wetting difficulty, the lock of strength imparted by good crosslinking still remains a problem. In addition, the application of a primer is labor intensive; consequently, it is frequently desirable to avoid this step. Also the primer must be allowed to sit for an appreciable interval of time after its application, lengthening the installation process and increasing its cost.

One-coat butyl rubber adhesive systems have also been widely used; however, from the standpoint of bond strengths, these materials produce indifferent results, intermediate between the primed and unprimed neoprene-phenolic systems.

DISCLOSURE OF THE INVENTION

Now, however, an adhesive system has been found which produces exceptionally strong and uniform bonds. The adhesive compositions of the invention are effective even in those instances where the dusting materials, commonly employed to keep adjacent surfaces of EPDM membranes stored in rolls from sticking to each other, have been incompletely removed during the installation process. The adhesives of the invention are effective with all EPDM roofing membrane products, which vary somewhat from manufacturer to manufacturer, and the installation of EPDM roofing systems under adverse weather conditions is made possible, even by unskilled workers, in a minimum of time. The adhesives of the invention also possess sufficient tack so that stable bonds can be produced and maintained in place during the time required for curing of the adhesive compositions to occur. The cured adhesives have elastomeric properties similar in nature to the EPDM membranes themselves, and thus are capable of successfully withstanding the significant mechanical, chemical and thermal stresses inherent in the roofing environment.

Of significant advantage is the fact that the adhesive compositions are curable in situ, and can readily be applied with a swab, brush, roller, spray gun or the like, without the necessity of using a primer, although the latter may be employed if desired.

BEST MODE FOR CARRYING OUT THE INVENTION

In accordance with this invention, an adhesive composition is formed from a blend of halogenated butyl rubber and EPDM rubber compounds, which include conventional curing systems. The compositions may be subsequently solvated and then applied to the surface of the EPDM membranes to be joined, or alternatively they can be used without solvents by forming the adhesive compounds into strips of adhesive tape. The adhesive compositions have also been found to have protective qualities when applied to substrates other than EPDM membranes, such as for example metal or other roofing surfaces.

In producing the adhesive compositions of the invention, the EPDM and butyl rubber compounds may be produced separately and then mixed together, or they may be mixed simultaneously. Standard rubber machinery can be used to accomplish the mixing operation, including such machinery as rubber mills, banbury mixers, continuous mixers and similar devices. Normally, during the mixing process, the rubber components are added first, and the curatives, accelerators and other compounding ingredients are added thereafter. In either event, the mixing process is continued until a homogeneous adhesive mixture is obtained.

In those instances in which a liquid adhesive is being prepared, the rubber compound is dissolved in a suitable solvent in an amount necessary to accomodate the method of application chosen, i.e. whether by brush, roller, spraying or equivalent technique. Alternatively, the adhesive mixture may be formed into thin strips by extrusion, by slitting thin sheets of the compounds, or otherwise.

Where a liquid form is to be applied, a strip of the EPDM membrane is located in its position of use, the edge portion is coated with the adhesive, and a second coated membrane strip is placed on top of the first so that the two strips overlap in the area covered by the adhesive. Advantageously, the freshly mated overlap area is pressed together with a roller of the type well known in the art to assure intimate contact and the elimination of any trapped air pockets.

In those instances where an adhesive tape is used, the technique is essentially the same, except where modified as hereinafter described.

EPDM rubbers employed in the invention may be defined in the usual conventional manner as amorphous, sulfur-vulcanizable, elastomeric unsaturated copolymers of at least two different alpha-monoolefins of the formula $CH_2=CHR$, where R is hydrogen or alkyl having, for example, 1 to 8 carbon atoms, and at least one copolymerizable polyene, ordinarily a diene, usually a non-conjugated diene, whether open chain as in 1,4-hexadiene, or cyclic, particularly a bridged ring cyclic diene, such as dicyclopentadiene or 5-ethylidine-2-norbornene. Usually the EPDM is a terpolymer of two alpha-monolefins, one of which is ordinarily ethylene, the other most frequently being propylene, and a non-conjugated diene, preferably of from 4 to 12 carbon atoms.

Halogenated butyl rubbers of the invention comprise copolymers of isobutylene or another isoolefin of closely related molecular weight with a diolifin, usually isoprene or butadiene, in which the major component is isobutylene and the minor component is the isoprene or butadiene, which have been halogenated. Any of the halogenated butyls are suitable for purposes of the invention; however, chlorobutyl and bromobutyl rubbers have been demonstrated to be especially useful, and of these, bromobutyl appears to consistently provide superior bond strengths.

The specific nature of the monomeric components of both the halogenated butyl and the EPDM rubbers, and the ratios of the components to each other, may be varied within the parameters well known in the art, as may be molecular weights of the rubbers, without adversely affecting their usefulness in practicing the herein disclosed invention. Any of the various types of such rubbers commonly available in the trade have been found suitable for the purposes of the invention, the primary difference between such materials being in characteristics such as, for example, their solvency, solution viscosity, green strength, relative acceptance of fillers and oils, their bond strength and the like. However these and other affected characteristics may readily be optimized through refining techniques normally practiced by those working in, and familiar with the field.

Surprisingly, it has been found that the halogenated butyl rubbers are more compatible with the EPDM rubbers than the regular butyls, and they have the additional advantage of improving flame resistance to systems containing them. Even more importantly, however, it has been found that they possess superior reactivity, and therefore have the characteristic of crosslinking at normal roof temperatures far more rapidly than ordinary butyls would. This unique quality assures that roofing joints employing adhesives of the invention quickly "set" into tough, integral bonds, normally exhibiting strengths in both the peel and lap shear tensile modes superior to adhesive systems presently known. They also show increased resistance to water permeation.

The proportion of halogenated butyl rubber to the EPDM rubber has been found to have an affect on the tackiness of the adhesive mixture, and therefore, on the ease with which the bonding process may be carried out. While the bonding characteristics of the various EPDM roofing membrane products vary somewhat, an optimum adhesive for any of such membranes can be obtained simply by varying the proportion of the halogenated butyl in the adhesive of the invention, to the amount of EPDM contained therein, until the most advantageous ratio is achieved.

It has been determined that the presence of relatively small amounts of the halogenated butyls are sufficient to obtain many of the notable improvements described. Thus an effective adhesive system can be produced with compositions containing, on a weight basis, anywhere from about 5 parts of the halogenated butyl to about 95 parts of EPDM, to about 95 parts of the halogenated butyl to about 5 parts of the EPDM. In most applications, however, it has been found desirable to employ from about 4 parts of the halogenated butyl to about 5 parts of the EPDM, to about 30 parts of the halogenated butyl to about 5 parts of the EPDM.

As mentioned in the preceding, a convenient method for applying the adhesives of the invention is in the form of a solution. Suitable solutions may be formed by dissolving the rubber mixtures of the invention in any of the solvents commonly used for rubber solutions including aromatics such as benzene, toluene, xylene etc., as well as carbon tetrachloride, chloroform, dipentene or others of the solvents commonly used for synthetic, natural, and halogenated rubbers. Such solvents may be employed alone, or in combination. The blending of various low boiling solvents is particularly useful in achieving varying evaporation rates, and for the purpose of reducing the tendency of the solutions to form surface skins.

The ratio of solvent to solute will depend on the viscosity requirements dictated by the method of application selected, as well as the polymeric components involved, including their molecular weight, and the nature of their monomeric constituents. However in a typical case, a solution, on a weight basis, of at least about 20% to 30% solid contents is easily applied by brush or roller, although more dilute or concentrated solutions can also be used if preferred. Solution of the rubber components is readily achieved through use of a standard churn or other ordinary mixer.

As described, the halogenated butyl and the EPDM rubbers may be compounded separately, or they may be compounded simultaneously. The technique of compounding separately is useful in the optimization process, since the relative amounts of the two rubber compounds may be easily altered in the final mixture of the two, to determine the optimum adhesive system. Once the optimum mixture has been determined, however, the rubber components and the balance of the rubber compounding ingredients may be mixed together simultaneously.

While the materials may simply be mixed in the solvent selected, it has been found that preparation of the solid rubber compound mixtures prior to their solution, enhances the physical properties of the adhesive produced.

In preparing the rubber compounds, use may be made of any of the well known rubber compounding ingredients, oils, fillers, cure systems, and the like known to those skilled in the art.

In the case of oils, the types and amounts added have an influence on the resulting adhesive systems, and in this regard, paraffinic oils have been found to be quite satisfactory, although other oils can be used effectively as well. Oil levels, on a weight basis, of from about 4 to 100 parts of oil, to about 100 parts of polymer have been discovered to be useful for purposes of the invention.

With respect to fillers, any of the commonly used rubber fillers can also be readily employed in the adhesive systems of the invention. Thus fillers such as carbon black, magnesium silicate, fumed silica and others may all be successfully incorporated in the adhesives. If desired, filler levels may be widely varied, and in fact filler levels, on a weight basis, of from about 60 to 100 parts, to about 100 parts of polymer, as well as levels above and below such amounts, may be used without difficulty.

Curing systems include those commonly known and employed in the art, as for example, systems relying on zinc oxide, sulfur, and accelerators, in addition to other curing ingredients related to the technology.

A typical method of applying the adhesive systems involves washing a 3"-4" width of EPDM roofing membrane with solvent, or a solvent-primer to remove talc and foreign dirt. Optionally, a primer such as for example a dilute solution of polyurethane in an aromatic solvent, may be applied to the surfaces to be bonded. The adhesive is thereafter applied, and the contained solvent is allowed to evaporate. The surfaces are subsequently mated, and firmly pressed together, for example, with the aid of a roller to remove any air pockets, thus producing a firm, uniformly bonded joint or seam.

The following examples, while not intended to be limiting in nature, are illustrative of the invention.

EXAMPLE 1

The EPDM employed is a low viscosity, highly crystalline, fast curing polymer exhibiting good green (uncured) strength, in which the diene monomer is 1, 4 hexadiene, marketed by E. I. DuPont under the trademark "Nordel 2722". A compound containing the material is made from the following ingredients:

| EPDM COMPOUND | |
|---|---|
| Material | Parts by Weight |
| Nordell 2722 | 100.0 |
| Zinc Oxide | 5.0 |
| Stearic Acid | 1.0 |
| 2-mercaptobenzothiozole | 1.5 |
| Carbon Black | 100.0 |
| Paraffinic Oil | 50.0 |
| Tetramethylthiuram disulfide | 0.8 |
| Tellurium diethyldithiocarbonate | 0.8 |
| Sulfur | 2.0 |
| Dipentamethylenethiuram hexasulfide | 0.8 |

The halogenated butyl used is a fast reacting brominated butyl polymer having the ability to co-vulcanize with, and adhere to highly unsaturated rubbers, marketed by Polysar Ltd. as "Polysar bromobutyl X2", and the compound incorporating it is prepared with the following materials:

| HALOGENATED BUTYL COMPOUND | |
|---|---|
| Material | Parts by Weight |
| Polysar Bromobutyl X2 | 100 |
| Carbon Black | 40 |
| Zinc Oxide | 5 |

The above two compounds are individually milled and subsequently diced into small cubes for ease of solution. Thereafter, the compound cubes are separately dissolved in toluene in amounts such that two solutions are formed having solids contents, respectively, of 30% by weight.

The resulting solutions are then mixed in the ratios shown in the tables below and applied to two pieces of EPDM roofing membrane, previously cleaned by wiping with a solvent-dampened swab. These are then mated and allowed to cure for 7 days at room temperature. Samples of the mated materials are subsequently tested to determine physical strengths, with the following results, in which peel adhesion refers to the test outlined in ASTM D 413 Type A (180 degrees), and in which a crosshead speed of 2"per minute is used.

| ADHESIVE COMPOSITION (Parts by Weight) | | |
|---|---|---|
| EPDM Compound | Halogenated Butyl Compound | PEEL STRENGTH (Lbs./lineal inch) |
| 100 | — | 0.5 |
| 75 | 25 | 1.0 |
| 50 | 50 | 6.5 |
| 25 | 75 | 7.0 |
| — | 100 | 3.4 |

While the peel strengths increase after exposure for one week at 158 degrees, the bond strengths retain the relatively to each other shown.

EXAMPLE 2

In further test, an EPDM compound is made as described in Example 1.

A halogenated butyl compound is produced from a chlorobutyl rubber manufactured by Polysar LTD., and designated by it as "Chlorobutyl 1255", with the following compounding ingredients:

| HALOGENATED BUTYL COMPOUND | |
|---|---|
| Material | Parts by Weight |
| Chlorobutyl 1255 | 100 |
| Carbon Black | 40 |
| Zinc Oxide | 8 |
| Sulfur | 1 |

The two compounds are again milled and diced into cubes, and then dissolved in toluene so that each of the resulting solutions has a total solids content of approximately 30% of weight.

The solutions are subsequently combined in the ratios shown below, applied to an EPDM membrane different than the one of Example 1, and cured for 7 days at room temperature. Results of testing by the procedure described in Example 1 are as follows:

| ADHESIVE COMPOSITION (Parts by Weight) | | |
|---|---|---|
| EPDM COMPOUND | HALOGENATED BUTYL COMPOUND | PEEL STRENGTH (Lbs/lineal inch) |
| 100 | — | 2.0 |
| 75 | 25 | 3.8 |
| 25 | 75 | 2.8 |
| — | 100 | 3.2 |

While all of the compositions described in Examples 1 and 2 exhibit many of the desirable adhesive properties previously described, the usefulness of testing for optimization purposes is shown by the fact that at a mixing ratio of 75 parts EPDM-25 parts halogenated butyl, the adhesive mixture of Example 1 demonstrated the next-to-lowest peel strength of the mixtures- tested, while the same ratio in Example 2 showed the highest strength. It has been found that the strength of the bonds will vary, depending on the nature of the adhesive component, as well as the nature of the material to be bonded. Consequently, in order to achieve the properties desired, it is advantageous to employ the optimization screening procedures described.

EXAMPLE 3

In a still further experiment, the lap shear tensile strength of an EPDM membrane seam formed with a variety of known adhesive systems is tested in comparison to a seam formed from an adhesive system as taught herein. The test employed essentially conforms to the lap tensile test outlined in ASTM test C-961.

The adhesive formulation of the invention tested is one in which 5 parts by weight of the EPDM compound of Example 1 are mixed with 15 parts by weight of the halogenated butyl compound of that Example, both compounds being in the form of solutions in toluene containing 30% by weight of solids, respectively. The adhesive mixture is used to prepare samples of EPDM seams which are "aged" (cured) and then tested.

The results obtained, in which the values shown indicate lap shear tensile strength in pounds per square inch required to destroy the bond, are as follows:

| ADHESIVE SYSTEM | EPDM MEMBRANE | | |
|---|---|---|---|
| | A | B | C |
| Contact Adhesive | 20 | 16 | 15 |
| Primer + Contact Adhesive | 37 | 51 | 30 |
| Butyl Adhesive | 29 | 38 | 23 |
| Butyl Tape Adhesive | 43 | 42 | 35 |
| Formulation of the Invention | >60* | 52 | 68 |

*(specimen broke)

The above results, in which the formulation of the invention surpassed the competitive systems, did so in spite of biasing the experiment in favor of the competitive systems by exposing the latter to heat aging for 10 days at 158 degrees F, versus only 7 days for the formulation of the invention.

Peel tests of the type described in Example 1 are also run with the results shown, measured in pounds/lineal inch.

| ADHESIVE SYSTEM | | |
|---|---|---|
| | Butyl Tape Adhesive | Formulation of the Invention |
| Peel Strength | 6.5 | 15.8 (Avg. of Membranes A, B, & C) |

Again, the experiment is biased in favor of the competitive system, which is heat aged at 220 degrees F for four weeks, compared with only 7 days at 158 degrees F for the system of the invention.

As hereinabove described, the adhesives systems of the invention can be applied in the form of an adhesive containing solution; alternatively however, they may be formed into tapes, which are placed between the EPDM surfaces to be bonded. In the latter embodiment, it is of considerable advantage if heat or pressure, or a combination of both is applied to a seam after it has been assembled into the membrane-adhesive-membrane lamination. Where such a treatment is not to be used, however, it has been found to be particularly beneficial to add at least about 10%–40% by weight, on a total solids basis, of a softening solid or liquid tackifier agent such as for example paraffin oils, compatible plasticizers, polybutene, or similar materials to the solid components of the adhesive formulation in order to provide a soft, tacky tape that will more readily facilitate bonding at ambient outdoor temperatures, as in the following example.

EXAMPLE 4

The adhesive mixture of Example 3 is modified by the addition of approximately 15% by weight, on a total solids basis, of polybutene, and the formulation is stirred until a substantially uniform solution is obtained. The resulting solution is then cast onto release paper and the solvent is allowed to evaporate, producing a soft film about 1/16 inch thick. The film is readily removed from the release paper, after which it is placed between two sheets of a loosely woven polypropylene skrim. The lamination thus produced is thereafter rolled to assure uniform, intimate contact and allowed to cure at room temperature for two weeks.

The prepared sample is subsequently subjected to testing in a 180 degree peel mode and found to result in failure of the skrim substrate, rather than at the point of adhesion.

While the adhesive systems of the invention produce unusually good bonding with the difficult-to-bond EPDM membranes they have also been found useful in forming bonds with materials other than EPDM. Various substances such as polyethylene, polypropylene, additional rubbers, fabrics and other materials may all be successfully bonded with the systems of the invention. In many such instances, substrate failure will occur before the bond when a specimen is subjected to a peel test, for example as shown in the following:

EXAMPLE 5

In an additional experiment, using the adhesive mixture of Example 3 and the polypropylene skrim of Example 4, the adhesive mixture is applied to two pieces of the skrim material. After 15 minutes drying time, the two adhesive coated pieces are pressed together, rolled to assure good contact, and allowed to cure at room temperature for two weeks.

The sample is then tested in a peel test mode. As in the case of the test of Example 4, the polypropylene skrim sheet is found to fail before the point of adhesive bond.

As previously mentioned, the adhesive systems of the invention may also be used as elastomeric coatings to provide weatherproofing protection for other substrates. Due to their adhesive nature and good weatherability features, the compositions of the invention lend themselves exceptionally well to applications of this sort by means of spray guns, particularly when formulated in low total solids formulations, although they may also be applied by rollers, brushes and the like. When used on substrates such as galvanized metal, fiberglass, concrete or other materials, they cling tenaciously and act to seal such substrates from the elements remarkably well. They can also be applied as liners for tanks made from these and other materials.

While the invention has been described with reference to certain specific embodiments and examples, it is not to be construed as limited thereto, inasmuch as variations and modifications of the invention are possible without departing from its spirit and scope as defined in the following appended claims.

What is claimed is:

1. A composition useful both as an adhesive and as a protective coating consisting essentially of rubber compounding ingredients and a polymer mixture consisting of:
   an EPDM rubber polymer component consisting essentially of at least two different alpha monoolefins and at least one copolymerizable polyene and a halogenated butyl rubber polymer component;
   a rubber solvent,
   the EPDM and halogneated butyl rubber components being present on a parts-by-weight basis of from about 4 parts of the halogenated butyl rubber component to about 5 parts of the EPDM rubber component, to about 30 parts of the halogentated butyl rubber component to about 5 parts of the EPDM rubber component.

2. A composition useful as an adhesive consisting essentially of rubber compounding ingredients and a polymer mixture consisting of:
   an EPDM rubber polymer component consisting essentially of at least two different alpha monoolefins and at least one copolymerizable polyene;
   a halogenated butyl rubber polymer component; and
   a polybutene will accomodate adhesive bonding at outdoor ambient temperatures,
   said EPDM and halogenated butyl rubber components being present on a parts-by-weight basis of from about 4 parts of the halogenated butyl rubber component to about 5 parts of the EPDM rubber component, to about 30 parts of the halogenated butyl rubber component to about 5 parts of the EPDM rubber component, and said composition being produced in the form of a tape.

3. A composition according to claim 1 in which the halogenated butyl rubber polymer is either a chlorinated or a brominated butyl rubber.

4. A composition according to claim 2 in which the tackifier is polybutene and is present in an amount of at least about 10% of weight, on a total solids basis, of the composition.

* * * * *